Feb. 2, 1932.  E. THOMSON  1,843,792

COMPOSITE SILICA ARTICLE

Filed Jan. 29, 1930

Inventor
Elihu Thomson,
by Charles E. Tullor
His Attorney.

Patented Feb. 2, 1932

1,843,792

UNITED STATES PATENT OFFICE

ELIHU THOMSON, OF SWAMPSCOTT, MASSACHUSETTS, ASSIGNOR TO GENERAL ELECTRIC COMPANY, A CORPORATION OF NEW YORK

COMPOSITE SILICA ARTICLE

Application filed January 29, 1930. Serial No. 424,378.

The present invention relates to the production of articles of fused silica which are fabricated in composite form, that is, where one portion of the fused silica article may be composed of the opaque or translucent variety, and another portion superposed thereon of the transparent variety of fused silica fused onto the backing or foundation or translucent material.

More particularly the invention relates to improvements of this character having specific application to the production of reflectors for astronomical instruments, such as astronomical mirrors used with telescopes and the like, in which a light-reflecting surface is maintained constant and of accurate figure or focus.

The invention is particularly a modification of the composite quartz body or astronomical reflector shown in my Patent No. 1,532,002 of March 31, 1925. In the invention above referred to, the foundation or backing of crude quartz as sand or crystals is heated in a mould to fusion resulting in an opaque or translucent mass, which is filled with innumerable minute cavities or bubbles having an irregular surface, and which may also contain large cavities. Upon the opaque or translucent backing made in this way is superposed a thinner layer of high grade transparent quartz by the fusion of small pieces of clear quartz arranged together upon the upper surface of the thicker quartz plate. Preferably the backing and the facing layer of transparent quartz are heated together in a suitable furnace to cause coalescence and the formation of a unitary structure. The surface of the article thus prepared is ground and silvered, or otherwise coated with a reflecting layer.

In the present invention I prefer to make the pieces of transparent quartz of preferably larger size than those shown in the invention above referred to, and where these pieces join, or at their marginal edges, there is usually left a dark line of demarcation, or even a depression at the joints.

I propose, in my improved method of making composite articles as hereinabove stated, to coat this upper surface of transparent quartz made of pieces fused together or in mosaic form, with a layer or layers of small granules of silica, sprayed by means of a suitable spraying torch onto said surface, and by means of a flame of sufficient temperature to produce fusion of the particles and coalescence thereof to produce a clear, transparent, smooth floor or surface superposed on the surface formed by the uniting of the mosaic pieces.

Figure 1:
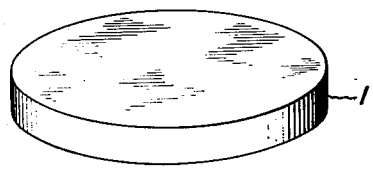
Figure 2:
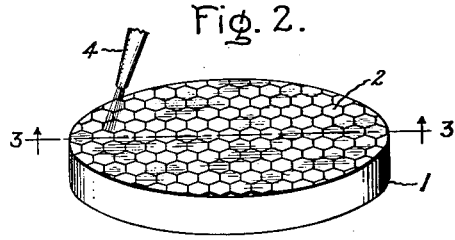
Figure 3:
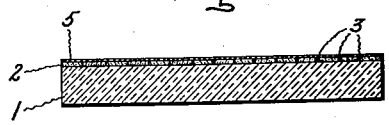

The invention will be more clearly understood by referring more specifically to the accompanying specification and drawings, in which Fig. 1 represents a slab of quartz made of a good grade of quartz sand, preferably coarse quartz heated in a carbon mould to the fusion temperature, that is about 1760° C. in an electrically heated furnace;

Fig. 2 represents the same slab showing the transparent pieces preferably of approximate hexagonal form laid upon the smoothed surface of the coarse quartz backing in preparation for fusion thereto and illustrating the application of the fusing torch or gun above the transparent material into which is fed the powdered, or better the granulated silica particles to form a sprayed layer constituting a final smooth surface on the blank;

Fig. 3 shows in elevational cross section the composite body as finally produced.

Referring more specifically to the drawings, 1 represents the blank of coarse fused quartz, made in the known ways from the melting of quartz particles which is done by constructing a mould of the form required and filling the same to the desired height with the quartz particles, such as the refined sand or small pieces of quartz. This is placed in an electric furnace, brought to a temperature of incipient fusion of quartz whereby a fused mass is obtained which is closely coherent but is filled usually with a great number of small bubbles or small cavities between the particles. Care is taken not to have the mass overheated but only to melt and cause complete and secure agglomeration of the particles. The mass is now slowly cooled, and may be removed from the furnace, or left there if an opening is made for working. It can be ground into any final shape, trimmed laterally, and the upper surface may be ground flat or ground slightly concave or convex, in accordance with what the final figure is to be.

The next step in the operation shown in Fig. 2 is to face this prepared slab with a layer of fused quartz pieces, that is, pieces which preferably have been fused and which have the proper thickness and dimensions. This is preferably done by fitting them together edgewise so as to form a sort of mosaic 2, and the pieces so fitted together may have any geometrical form, but preferably the form of a square or hexagon is best suited for the purpose. This structure is now made a single structure by fusion in the electric furnace to that temperature which causes a softening of the base body as well as the flooring or layer of clear material or material of higher grade which has been laid upon it. This heating also tends to unite the edges 3, 3, 3 etc. (Fig. 3) of the pieces which have been laid upon the thicker blank below.

The next stage in the operation of this composite body is to spray upon its upper surface, after such surface has been properly levelled or formed, a layer of transparent, clear, almost bubble-free high grade quartz, by feeding into a suitable blow-pipe 4 with mixed gases, (giving when burned together a high temperature) carefully selected graded granules of quartz, which upon reaching the surface are fused together and form a glazing or more or less thin coating 5 of high grade material. This coating is vitreous and continuous or structureless and may be of any desired thickness. By suitably adjusting the spraying it can be made substantially the same thickness all over the surface. During the spraying it is desirable to maintain the temperature of the whole mass at approximately 1100° C., so that the form of the mass is not changed while the slight contraction on cooling does not produce fracture.

The final operation is the annealing or cooling, at a comparatively slow rate, of the whole mass as uniformly as possible, though in the case of fused quartz far less precaution is required than in the case of the cooling of a mass of glass.

When these operations have been properly performed, we have a new body composed of an under supporting layer 1 of coarse material, an intermediate layer 2 much less in thickness of a higher grade material, practically free from bubbles, and a thinner layer 5 of glazing or enamelling of a layer of the highest grade of fused quartz. Such a body is now ready for such final grinding, polishing and figuring as may constitute it a valuable mirror in astronomical or physical work. It is only limited in size and capacity by the size of the furnace and to the appurtenances belonging to the operation and the availability of material.

What I claim as new and desire to secure by Letters Patent of the United States, is,—

1. A composite quartz article comprising a backing plate of opaque or translucent quartz glass having superposed thereon and fused thereto a flooring of transparent quartz glass composed of separate pieces of said transparent material, and a relatively thin coating of transparent fused quartz superposed on the flooring, filling the depressions between the pieces and affording a glossy, smooth, outer layer fused to the tile flooring whereby the whole forms an integral structure.

2. An astronomical mirror-blank comprising a translucent backing plate of crude quartz glass having superposed thereon and integrally united therewith by fusion pieces of transparent quartz glass conforming thereto and joined at their edges to each other and at their bottom surfaces with the translucent backing, and a relatively thin, homogeneous, glossy layer of transparent quartz superposed on the transparent pieces by fusion whereby the whole constitutes an integral structure, provided with a clear, smooth transparent surface which may be silvered for use as an astronomical reflector.

3. A composite article of crude silica, a layer fused thereto comprising pieces of transparent silica and a continuous, structureless coating of transparent fused silica superimposed on said layer and forming a glazing over said pieces.

In witness whereof, I have hereunto set my hand this 22nd day of January, 1930.

ELIHU THOMSON.